Feb. 2, 1954   D. B. SALSTROM ET AL   2,667,901
PATTERN CONTROLLED SHAPING MACHINE
Filed Nov. 28, 1950   6 Sheets-Sheet 1
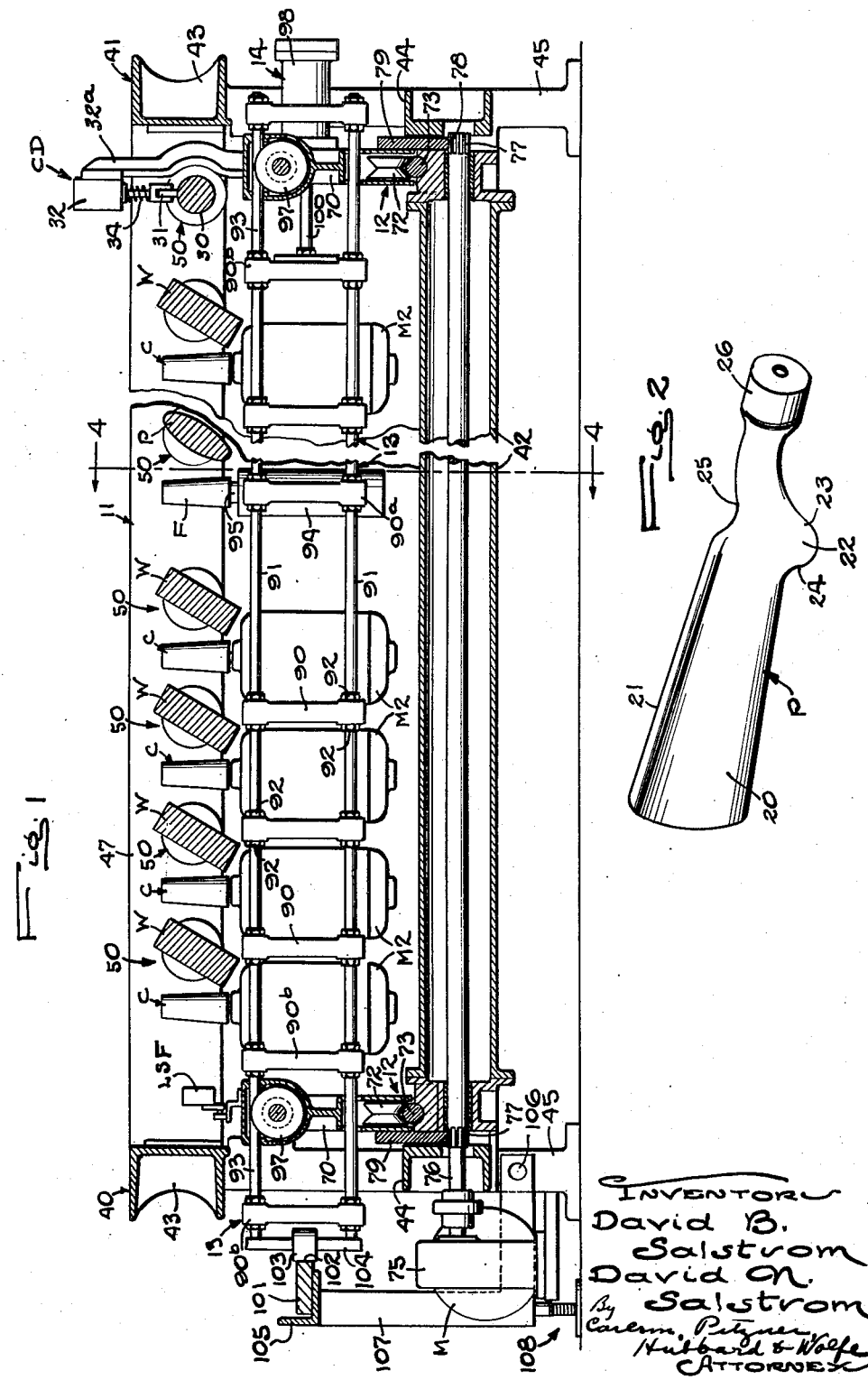

Feb. 2, 1954                D. B. SALSTROM ET AL                2,667,901
                      PATTERN CONTROLLED SHAPING MACHINE
Filed Nov. 28, 1950                                         6 Sheets-Sheet 2
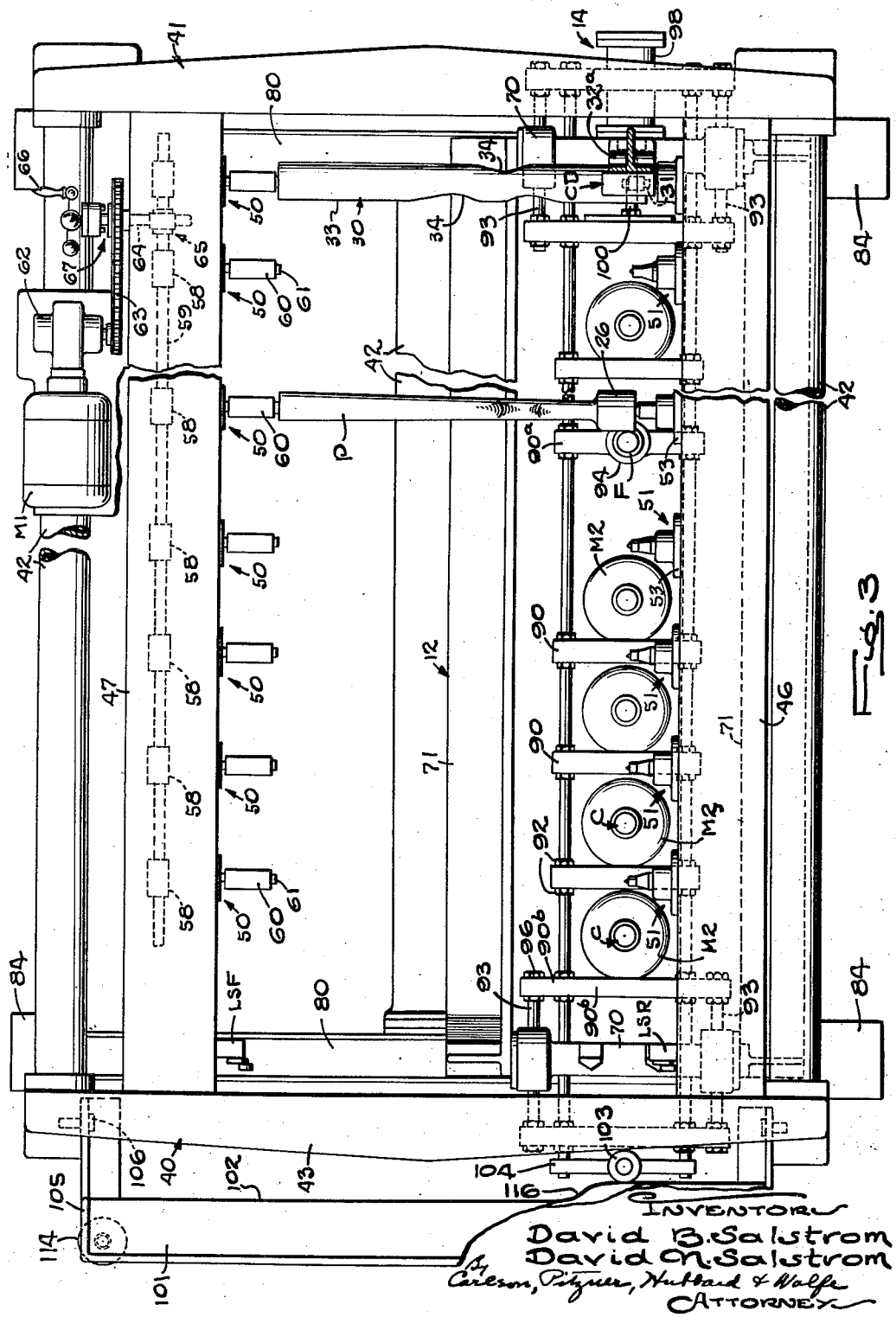

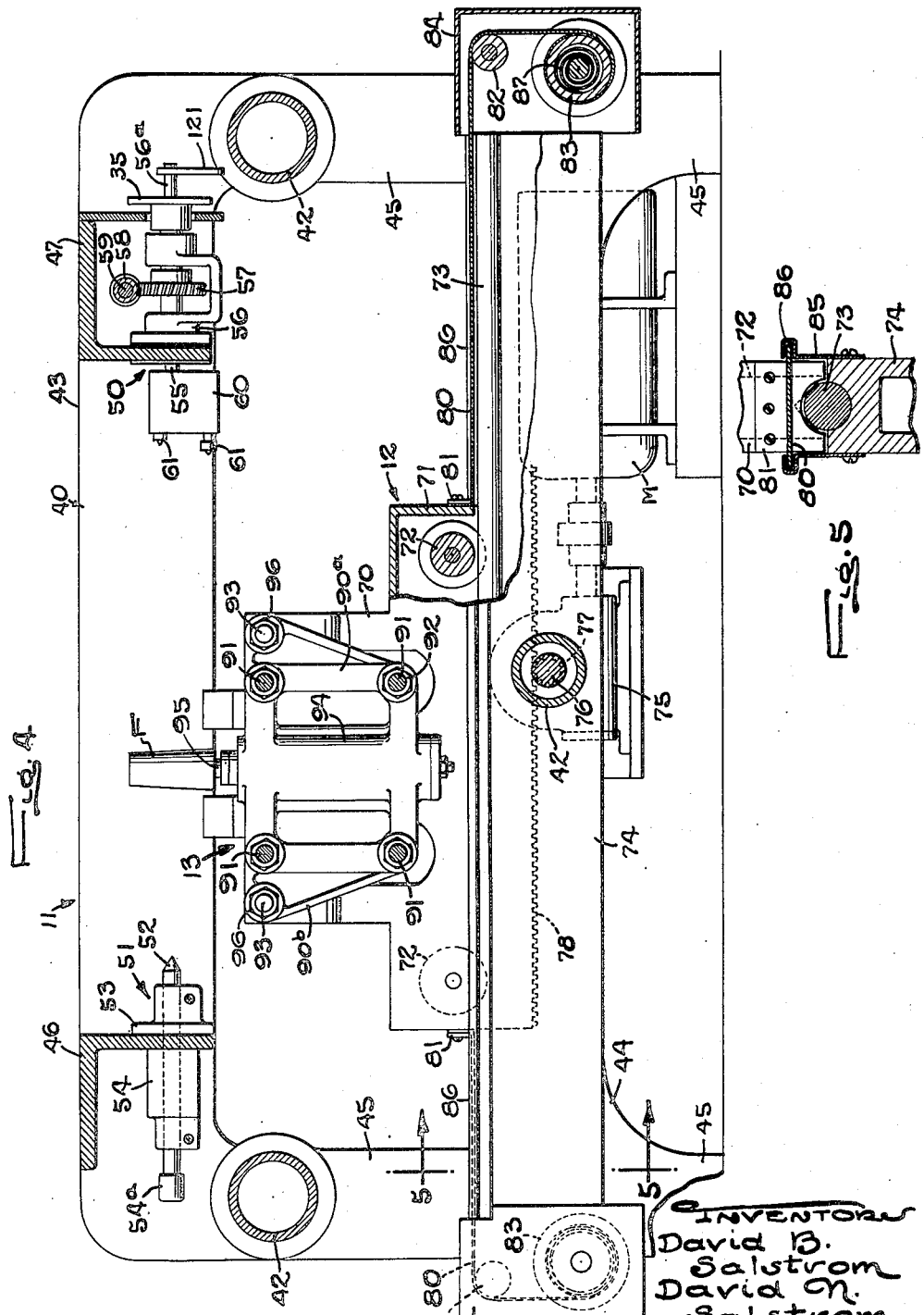

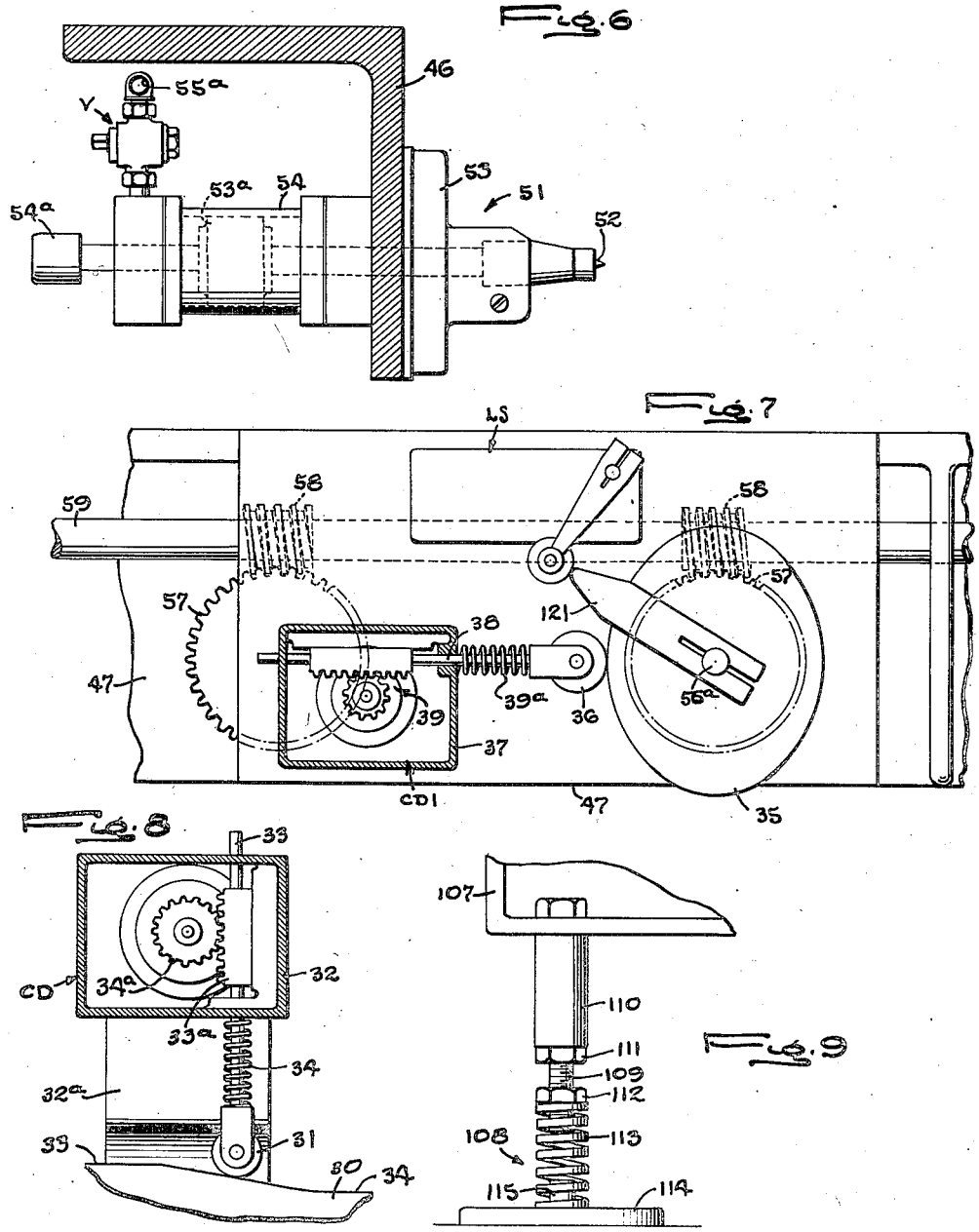

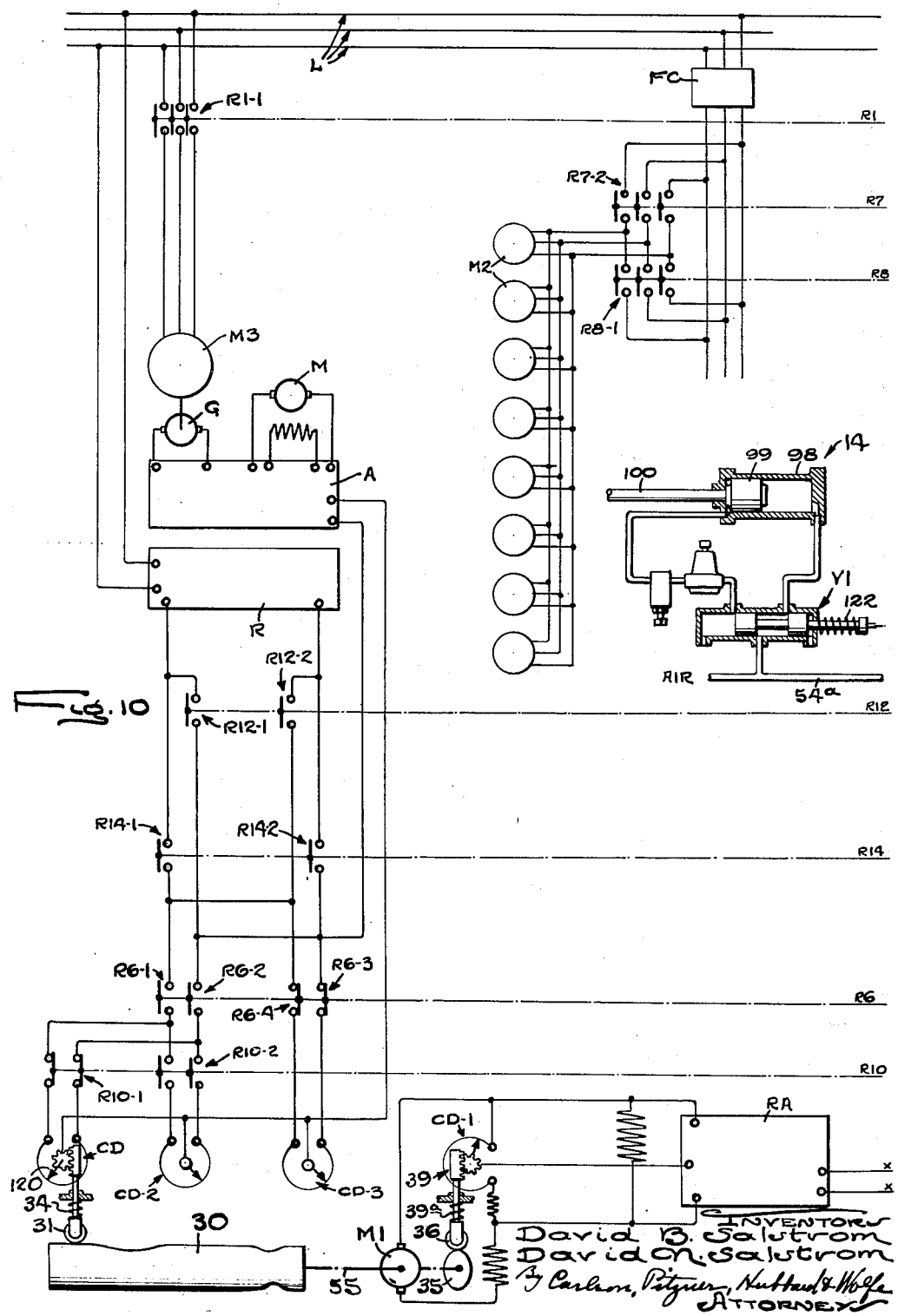

Patented Feb. 2, 1954

2,667,901

UNITED STATES PATENT OFFICE 2,667,901

PATTERN CONTROLLED SHAPING MACHINE

David B. Salstrom, Chicago, and David N. Salstrom, Wheaton, Ill., assignors to Salstrom Carving Machine Company, Chicago, Ill., a corporation of Illinois Application November 28, 1950, Serial No. 197,876

11 Claims. (Cl. 142—15)

The invention relates to machines for shaping articles of irregular form and contour, and more particularly to machines for shaping articles having irregular generally curvilinear surfaces of revolution.

Articles of the type above referred to are commonly shaped by relatively reciprocating a cutter and workpiece substantially parallel to the longitudinal axis of the latter while a simultaneously relatively reciprocated pattern, model or template and follower element control the position of the cutter with respect to the workpiece. To present the surface of the workpiece for successive longitudinal cuts, the workpiece and pattern are rotated in synchronism either continuously or in intermittent steps.

One object of the invention is to provide an improved machine for shaping articles in accordance with the above procedure embodying novel drive means and control mechanism therefor which materially increases the productive capacity of the machine and enables it to produce a smooth true surface on the workpiece that requires a minimum of supplementary finishing.

A more specific object is to provide improved mechanism by which the rate of relative traverse of the cutter and the workpiece may be coordinated with the angular disposition of the area of the workpiece being operated on so as to insure the most efficient operation of the machine at all times. In particular it is the aim of the invention to provide for regulating the traverse rate of the cutter so that areas of the workpiece in which there is an abrupt change in the surface contour may be finished smoothly without chipping or splintering.

Another object is to organize the cutter and work supporting structures of the machine to provide unobstructed access to the latter and thus afford greater safety in operation and facilitate the loading and unloading of the workpieces.

Still another object is to simplify the construction and to provide a cleaner and more compact machine structure.

A further object is to provide improved means for positioning a cutter at the start of a cutting stroke so that any bouncing or chatter of the cutter on engaging the workpiece is avoided.

Other objects and advantages of the invention will become apparent from the following detailed description of the preferred embodiment illustrated in the accompanying drawings, in which:

Figure 1 is a longitudinal vertical sectional view of a shaping machine embodying the features of the invention.

Fig. 2 is a perspective view of a pattern representing a typical article capable of being produced by the improved machine, the article in this instance being a conventional gunstock.

Fig. 3 is a plan view of the machine.

Fig. 4 is a transverse vertical sectional view of the machine taken in a plane substantially on the line 4—4 of Fig. 1.

Fig. 5 is a sectional view taken in a vertical plane substantially on the line 5—5 of Fig. 4 showing details of the guideway for the reciprocating frame or carrier.

Fig. 6 is a fragmentary view of the actuator for advancing and retracting the work tailstock center.

Fig. 7 is a fragmentary elevational view of the work and pattern rotating means and associated control mechanism.

Fig. 8 is a fragmentary view showing a part of the speed control mechanism for the carrier drive means.

Fig. 9 is a detail view of one of the cam supporting elements.

Figure 10A:
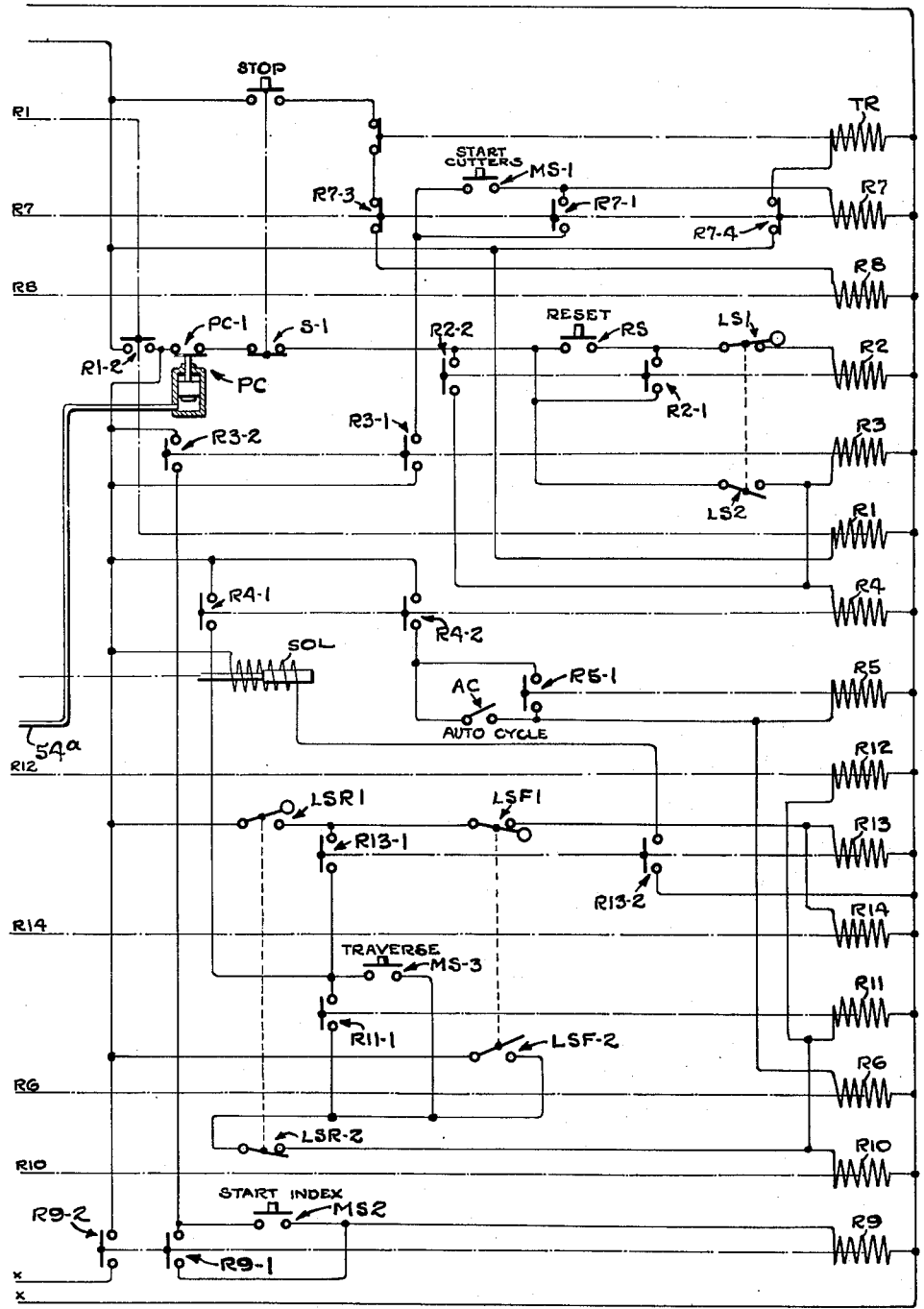

Figs. 10 and 10A when arranged in side by side relation illustrate diagrammatically the pneumatic and electrical operating and control circuits of the machine.

For purposes of illustration the invention has been shown as embodied in a machine for simultaneously shaping a plurality of articles of wood, plastic or other relatively soft material in conformity with a pattern, model or template having approximately the same dimensions as the finished article. It will be understood, however, that the invention is not limited to multiple unit machines, nor to machines for operating on any particular material. It will also be understood that the machine structure selected to illustrate the invention is exemplary and that various changes and modifications may be made in the form, construction and arrangement of the parts without departing from the spirit and scope of the invention as defined by the appended claims.

In the exemplary machine as shown in Figs.

1, 3 and 4, a plurality of workpieces or blanks W of the stock to be shaped and a pattern P representing the shape to be reproduced, are supported for rotation about their longitudinal axes and with the axes substantially parallel and uniformly spaced apart. A like plurality of rotatably driven cutters C and a pattern follower F shaped similarly to the cutters are supported at the sides of the workpieces and pattern for coaction respectively therewith. The cutters and the follower may thus be operatively associated with or retracted from the workpieces and pattern by relative movements of those elements in a path disposed transversely of the workpiece axes. Relative movement of the elements in a path parallel to the axes is effective to traverse the cutters longitudinally of the workpieces, while the follower coacts with the pattern to determine the depth of cut taken by each cutter so as to reproduce on the workpiece a contour corresponding to that of the pattern. Rotation of the workpieces and pattern in synchronism presents successive areas for the action of the cutters and follower so that the entire surface of each workpiece is shaped in conformity with the pattern in a single revolution.

The relative movements of the coacting elements may be effected in any preferred manner. In the particular machine illustrated the workpieces W and pattern P are supported on a stationary frame 11 while the cutters C and follower F are carried by a movable frame or carrier 12 having an auxiliary frame 13 mounted thereon. The carrier 12 in the present instance is mounted for reciprocation in a path parallel to the workpiece axes, while the auxiliary frame is supported for reciprocation in a path normal to that of the carrier or transversely of the workpiece axes.

Reciprocation of the carrier 12 is effected by drive means including a variable speed electric motor M. Other drive means including a variable speed electric motor M1 rotates or indexes the workpieces and pattern. Power actuated means, herein shown as a pneumatically operated actuator 14, is provided for shifting the auxiliary frame 13 relative to the carrier 12 to advance and retract the cutters and follower with respect to the workpieces and pattern.

In accordance with one aspect of the invention, novel mechanisms are provided in association with the carriage driving motor M and the indexing motor M1 whereby the traverse of the cutters relative to the workpieces and the indexing of the latter are automatically adjusted to the rate best suited for developing the desired surface contour and finish. Such adjustments are particularly advantageous when the article to be shaped has abrupt changes in its surface contour. In the case of a gunstock having the shape of the pattern P shown in Figs. 1 and 2, for example, the butt portion of the stock has sides 20 which are generally flat or formed on relatively long radii while the intervening edges 21 are formed on much shorter radii. Adjacent the forward end of the stock a grip element 22 projects abruptly from the lower edge thereof, presenting surface areas 23 and 24 disposed at relatively steep angles to the longitudinal axis of the stock. The edge opposite the grip element is conventionally formed with a notch 25 and also presents relatively steeply inclined surfaces for shaping by the cutter. The bell 26 shown on the forward end of the pattern P is merely for convenience of mounting it in the machine.

The control mechanism of the present invention permits the shaping of a gunstock of the above type in the shortest possible time consistent with the production of a smooth true surface finish. It accomplishes this result by regulating the speed of the motor M so as to traverse the cutter along the workpiece at a predetermined rapid rate when operating on surfaces approximately parallel to the axis of the article and at a substantially slower rate when operating on the surfaces inclined at an angle to the axis. To this end the mechanism includes a speed control cam 30 supported on the frame 11 with its axis parallel to the axes of the pattern P and workpieces W and rotated in synchronism therewith. A follower 31 supported on and reciprocable with the carrier 12 is positioned to coact with the cam 30 and to actuate a control device CD for regulating the speed of the motor M.

The control device is preferably of the rotary type and is conveniently enclosed within a housing 32 carried by a bracket 32a upstanding at one end of the carrier 12. As shown in Fig. 8, the follower 31 comprises a roller journaled on the lower end of a rod 33 slidable axially in the housing 32. A spring 34 urges the rod and follower roller downwardly or toward the pattern P. Movements of the rod are transmitted to the control device through the medium of a rack 33a fast on the rod and connecting with a pinion 34a rigid with the rotatable element of the control device.

To enable the cam 30 to perform its controlling function, it is formed with a surface of revolution coordinated with the surface contour of the pattern P, that is, the radial dimensions of the cam at every point are definitely related to the optimum traverse rate for the cutter at corresponding points on the pattern. As a practical matter the major portion of the cam surface may be uniformly cylindrical, as indicated at 33 in Fig. 3, the radius of such portion being dimensioned so as to position the follower 31 for effecting traverse at the maximum speed. When a slower speed is indicated, as when the cutters engage one of the angularly disposed surfaces 23 or 24, or the sides of the recess 25, for example, the surface of the pattern is appropriately recessed as at 34 to permit the follower to advance and actuate the control device 32 for reducing the speed of the motor M. Thus the traverse rate of the cutters is reduced only when operating on areas of the workpieces requiring the slower rates and at all other times traverse is at the faster rate so that waste of machine time is effectively avoided.

To further enhance the efficiency of the machine, provision is also made for varying the indexing speed in accordance with the contour of the area being shaped. More particularly, the indexing speed is regulated so that the workpieces are advanced relatively slowly when the cutters are operating on the areas corresponding to the flat sides 20 of the pattern and at a faster rate when the cutters are shaping the areas of shorter radius, such as those corresponding to the edges 21 of the pattern. The basic rate of advance of the workpieces is determined, of course, by the character of the material and the shape of the blank, the rate being set so as to avoid overloading the cutter at any time. Control of the motor M1 is effected by means of a cam 35 (Figs. 4 and 7) rotatable in synchronism with the pattern P and workpieces W and acting through a follower 36 to actuate a control device CD1 associated with the motor, as will appear presently.

As shown in Fig. 7, the control device CD1 is encased in a housing 37 supported on the rear frame rail 47 adjacent the cam 35 which is supported on the projecting ends 56a of one of the spindles 55 (see Fig. 4). Control device CD1 is also of the rotary type and is actuated by the follower 36 through the medium of a sliding rod 38 which carries the follower and which has a rack and pinion connection 39 with the rotatable element of the device. A spring 39a acting on the rod 38 yieldably urges the follower against the cam 35.

Turning now to a more detailed description of the exemplary machine, and referring particularly to Figs. 1, 3 and 4 of the drawings, it will be observed that the machine elements above referred to are supported on a rigid frame structure comprising end members 40 and 41 connected by tubular transverse members 42. The end members may conveniently comprise castings providing upper and lower cross members 43 and 44 supported at opposite ends by integrally formed legs 45.

The work supporting frame 11 as herein shown, comprises a pair of angle bars 46 and 47 supported in spaced parallel relation between the upper frame members 43. These bars carry a plurality of pairs of alined head and tailstocks 50 and 51 for supporting the workpieces W, pattern P and the speed control cam 30. In this instance the headstocks 50 are supported on the rear angle bar 47 and the tailstocks 51 are supported on the front angle bar 46.

The head and tailstocks may be of conventional construction. The latter, as shown in Figs. 4 and 6, comprises a center 52 mounted for axial movement in a bracket 53 secured to inner sides of the bar 46 and extending through a cylinder 54 mounted on the opposite side of the bar. A piston 53a fixed on the center within the cylinder is operative to move it to work engaging position upon admission of pressure fluid, such as compressed air, to the outer end of the cylinder. A handle or knob 54a is provided on the projecting end of the center for manual withdrawal to release the work. A conduit 55a equipped with suitable valve means including a manually operable valve V for each center is provided for supplying pressure fluid to the cylinders 54.

Each of the headstocks 50 comprises a spindle or center 55 journaled on a bearing bracket 56 mounted on the rear angle bar 47. The spindle is rotatably driven through the medium of a worm wheel 57 keyed thereto and cooperating with a worm 58 fast on an indexing shaft 59 extending across the frame structure and suitably journaled thereon. The forwardly projecting end of the spindle 55 is fitted with a head 60 equipped with laterally spaced spurs 61 for drivingly engaging the workpiece, pattern or cam with which it is associated.

The indexing shaft 59 is driven by the motor M1 through the medium of a speed reducer 62 (Fig. 3) having a chain and sprocket connection 63 with a cross shaft 64 journaled on the frame bar 47 and drivingly coupled to the indexing shaft by suitable gearing 65. To facilitate setting up the machine the shaft 64 is provided at its projecting rear end with a hand wheel 66 adapted to be engaged with or disengaged from the shaft by means of a clutch 67.

The carrier 12 in its preferred form comprises an elongated generally rectangular frame having upright end members 70 rigidly connected by transverse members 71. As explained heretofore, the carrier is supported on the machine frame for reciprocation parallel to the axes of the workpieces W and pattern P. Such support is provided by a pair of grooved rollers 72 journalled on each of the frame end members 70 and adapted to run on ways formed by cylindrical guide bars 73. The guide bars are supported at the inner sides of the end members 40 and 41 of the frame by rigid cross beams 74 suitably secured to the end members.

Reciprocation of the carrier 12 is effected by the motor M through a speed reducer 75 which drives a shaft 76 extending across the machine frame and suitably journaled thereon. Adjacent each end of the frame the shaft is formed with teeth constituting pinions 77 engaging with rack teeth 78 formed in the lower edges of plates 79 fixed to the respective end members 70 of the carrier.

Means is provided for protecting the carrier ways from chips or other foreign material without interfering with the reciprocation of the carrier. Thus for each way there is provided a pair of guard aprons in the form of elongated strips 80 of fabric or other flexible material arranged in pairs on opposite sides of the carrier and extending therefrom above and longitudinally of the associated guide bar 73. Each strip is secured at one end to the carrier as by a clamp 81 and is led over an idler roller 82 adjacent the end of the guide bar to a cylindrical drum 83 journaled in a housing 84 mounted on the machine frame. Side plates 85 attached to the frame member 74 as shown in Fig. 5, are formed with channels 86 for the reception of the edge portions of the strip 80, thus effectually sealing the space around the guide bar from the entry of foreign materials.

To accommodate the reciprocating movements of the carrier, a spring 87 enclosed within the drum 83 is tensioned so as to rotate the drum in a direction to wind up the strip 80 and thus maintain it taut as the carrier moves back and forth. The strip is payed out from the drum, of course, as the carrier moves away from it.

The carrier 12 supports the cutter frame 13 for movement transversely of the workpiece and pattern axes so that the cutters and follower may be fed to and retracted from the workpieces and the pattern. The cutter supporting frame in its preferred form comprises a series of rectangular frame members 90 each apertured at its four corners for the passage of transverse tie rods 91. The frame members are anchored to the rods to form a rigid structure by opposed clamping nuts 92 screwed onto appropriately threaded sections of the rod on opposite sides of the respective members. Adjustment of the frame members longitudinally of the rods may be effected by manipulating the nuts.

The number of the frame members 90 provided is determined by the capacity of the machine, that is, by the number of cutters with which it is to be equipped. In the particular machine illustrated, the frame has twelve of the members 90, eight of them being utilized as supports for the cutter driving motors M2, one member 90a for supporting the pattern follower F and the remaining three members along with one of the motor supporting members 90b carrying guide rods by which the frame is supported and guided for reciprocation.

The motor supporting members are preferably arranged in two similar groups on opposite sides of the follower support 90a. The members 90b are disposed in pairs at opposite ends of the frame. As will be seen by reference to Figs. 1 and 3 of the drawings, the cutter driving motors M2 are mounted on the frame members with their shafts vertical and in the present instance the cutters C are mounted directly on the upper ends of the motor shafts.

The follower supporting member 90a, as shown in Fig. 4, is formed with an integral upright sleeve portion 94 journaling a vertically disposed shaft 95 upon which the follower F is mounted. In general, the follower F conforms in shape and dimensions to the cutters C and the associated supports are spaced apart along the frame so that the follower and cutters are correspondingly positioned with respect to the pattern and the several workpieces.

As will be seen by reference to Figs. 3 and 4 of the drawings, the frame members 90b are somewhat wider at their upper ends than the companion frame members and are apertured to support the guide rods 93 parallel to but laterally spaced from the tie rods 91. Nuts 96 threaded on the guide rods on opposite sides of the frame members rigidly secure the parts together.

The guide rods 93 support the frame 13 on grooved rollers 97 journaled on the end members 70 of the carrier 12. As shown in Fig. 1, the rollers are mounted adjacent the upper ends of the carrier members and the latter are suitably apertured to provide passages for the tie rods 91 and guide rods 93. This mounting permits smooth and easy movement of the supporting frame to feed the cutters C and follower F to the workpieces and pattern and to retract them therefrom.

Feed and retracting movements are imparted to the supporting frame by the pneumatic actuator 14. This actuator is preferably of the double acting cylinder and piston type, comprising a cylinder 98 (Figs. 1, 3 and 10) supported in a horizontal position on one of the end members 70 of the carrier. A piston 99 working in the cylinder is connected by a piston rod 100 with the inner frame member 90b at one end of the cutter frame. Accordingly, by introducing pressure fluid such as air to the inner end of the cylinder 98 the frame may be advanced to the right as viewed in Figs. 1 and 3 to feed the follower F and cutters C against the pattern P and workpieces W. Introduction of pressure fluid into the outer end of the cylinder results in the shifting of the cutter frame in the opposite direction or toward a retracted position.

To avoid unnecessarily long retracting movements of the cutter frame and thus minimize idle working time of the machine, provision is made for positively limiting the movement of the frame in the retracting direction. Moreover, the limiting means is constructed and arranged to stop the frame with a minimum of shock and jar to terminate the retracting movement. When the machine is to be operated with the cutters C active while traversing the workpieces in one direction and idle during the traverse in the other direction, the limiting means may be further arranged to advance the cutter frame independently of the actuator 14 so as to bring the follower F and cutters C into engagement with the pattern and the workpieces without bouncing or chatter.

The limiting means in its preferred form comprises an elongated cam 101 disposed at one end of the machine and having a cam surface 102 positioned for engagement by a follower roller 103 supported on a crosspiece 104 rigidly secured to the projecting ends of the frame tie rods 91. The cam 101 is carried on a U-shaped frame 105 having its legs pivotally secured as by pins 106 to the front and rear legs of the frame member 40 for rocking movement about a horizontal axis. The frame 105 is normally supported in a horizontal position by depending legs 107 equipped with resilient floor engaging feet 108. As shown in detail in Fig. 9, each of the feet 108 comprises a bolt 109 inserted through an opening in the lower end of the leg 107 and secured thereto by a spacing sleeve 110 and nut 111. A stop nut 112 threaded on the projecting end of the bolt rests on the upper end of a heavy compression spring 113 which, in turn, rests upon a floor engaging plate 114. A stud 115 on the upper face of the plate retains the spring and plate in assembled relation.

By engagement of the follower 103 with the cam 101 in a retracting movement of the cutter frame, the cam supporting frame 105 is rocked downwardly against the action of the springs 113. The forces involved are thus absorbed by the springs and the frame is brought to a stop with a minimum of shock.

To provide for advancing the cutter frame to associate the follower and cutters with the pattern and work independently of the actuator 14, the cam surface 102 is formed with a rise 116 adjacent one end effective to gradually shift the frame to the right to the extent desired. It will be understood, of course, that the main portion of the cam surface 102 is positioned to allow retraction of the frame sufficiently to disengage the follower and the cutters, the pattern and the workpieces.

The novel speed control for the carrier drive motor M is particularly well adapted for use with a current supply system of the type known in the art as the electronic amplidyne. That system comprises generally a direct current generator G (Fig. 10) driven by a motor M3 supplying accurately controlled current to the machine motor, in this instance the carrier reciprocating motor M. Associated with the generator and motor is an electronic amplifier A for supplying the control-field currents from a small control voltage input signal. In the above environment the control device CD takes the form of a rheostat or potentiometer connected in circuit with the amplifier A for generating the input signal. As herein shown, the control device includes a contact arm 120 carried by the rotary element of the device which is adapted to be rotated in response to movements of the follower 31 in coaction with the pattern P as before explained. Current is supplied to the control device by way of a rectifier R connected to the alternating current power line L which also supplies current to to the motor M3. The arrangement is such that as the control device is rotated in one direction from the position in which it is shown, as for example clockwise as viewed in Fig. 10, the speed of the motor M is decreased while rotation of the control device in the opposite direction from the position shown increases the speed of the motor.

Preferably a second control device CD-2 similar to the control device CD but manually operable is provided for controlling the motor speed during idle return of the carrier. The control system is arranged, of course, to render one or the other of these control devices operative at the proper time in the cycle. A third control device CD-3 may also be provided for use when the machine is operated under manual control.

The direction of rotation of the motor M and therefore the direction of movement of the carrier 12 is controlled by switching the connection between the rectifier A to the control device CD-1 from one side of the device to the other. This switching is effected automatically by the control system as will appear presently.

The indexing motor M1 may also be a direct current motor and its speed control is preferably effected by controlling the armature voltage in accordance with the system of control known as the THY-MO-TROL drive. In that system current is supplied to the motor from a rectifier-amplifier RA with which the control device CD-1 in the form of a rheostat or potentiometer is connected in controlling relation.

To further increase the efficiency of the machine and to minimize the attention required from the operator, the invention provides a comprehensive control system adapted to automatically initiate the various machine operations in proper sequence for completely shaping a set of workpieces. In other words, the control system is constructed and arranged so that after the workpieces have been properly set up in the machine the operator is merely required to start the machine and thereafter operation proceeds until the workpieces have been finished. Provision is made, of course, so that the operator may take over control of the machine at any time so that any of the operations may be carried out independently without automatic cycling, as when setting up the machine.

Preparatory to placing the machine in operation, the main switch (not shown) is closed to connect the line L to the source of electric current. The compressed air supply is then turned on, admitting air under pressure to the conduit 54a which supplies operating air to the tailstocks 51 and to the pneumatic actuator 14 for the cutter supporting frame 13. At such time control valve V1 will be set in the position shown in Fig. 10 to direct air to the outer end of the cylinder 99 to urge the piston 99 outwardly or toward the left and thus shift the frame 13 to retracted position, or to maintain it in such position if it was previously retracted. The retracted positon, of course, is defined by the cam 102 and cooperating follower 103, as previously explained.

Admission of air under pressure to the conduit 54a also serves to operate a pneumatic contactor PC which closes an interlock switch PC-1. This switch is open when the air supply for the machine is cut off and prevents the starting of a machine cycle under those conditions.

When the machine is idle, the carrier 12 is normally in its forward position for convenience in loading the workpieces between the centers. Limit switches LSR and LSF are provided on the machine frame for operation by the carrier at the limits of its forward and return strokes. Normally switch contacts LSR-1 and LSF-2 are open and switch contacts LSR-2 and LSF-1 are closed. As the carrier approaches the end of its forward stroke, contacts LSF-1 are closed and contacts LSF-2 are opened. Similarly, at the end of the return stroke, contacts LSR-1 are opened and contacts LSR-2 are closed. A cycle control switch AC is closed manually for automatic cycling and is left open when manual control is to be used.

Current in the line L energizes a relay R1 of the control system, which closes switch R1—1 to start the Amplidyne generator motor M3. The relay also closes a switch R1—2 to prepare the control system for operation.

Assuming that the workpieces and pattern are properly positioned for the initial cut, indexing limit switch LS will be operated to close switch contacts LS1—1 and open switch contacts LS-2. This switch is mounted on the work supporting frame 11, as shown in Fig. 7, and positioned for actuation by an arm 121 fast on the projecting end of the center 56a which carries the speed control cam 35.

Momentary closure of a reset switch RS conditions the control system for operation by completing a circuit for a relay R2 by way of the limit switch LS1, a normally closed stop switch S—1 and pneumatic interlock switch PC-1 and switch R1—2. Relay R2 upon energizing closes switch R2—1 to complete a holding circuit for maintaining itself energized when limit switch LS-1 opens upon movement of the arm 121 out of engagement wth the switch. The relay also closes switch R2—2 to complete an energizing circuit for relays R3 and R4. Relay R3 closes switch R3—1 to prepare the cutter motor starting circuit and closes switch R3—2 to prepare the index motor starting circuit.

Relay R4 upon energizing closes switch R4—1 to prepare the traverse starting circuit and closes switch R4—2 to complete an energizing circuit by way of the cycle control switch AC for energizing a relay R5 and R6. Relay R5 merely closes switch contacts R5—1 to complete a holding circuit for itself and for relay R6 independently of the switch AC. Relay R6 closes switches R6—1 and R6—2 to connect the control devices CD and CD2 in controlling relation to the Amplidyne amplifier A. Relay R6 also opens switches R6—3 and R6—4 to disconnect the third control device CD3 from the amplifier A.

The control system being conditioned for operation as above described, the cutter driving motors M2 are started by momentary closure of a manually operable switch MS-1. The closure of the switch MS1 completes an energizing circuit for a relay R7 by way of previously closed switch R3—1. Relay R7 completes a holding circuit for itself independently of the starting switch by closing contacts R7—1. It also closes switch R7—2 to start the cutter driving motors M2. Switch R7—3 is opened to prevent energization of relay R8 which, through switch R8—1, is operative to reverse the current supply to the motors M2 and thus bring them to a quick stop. A timing relay TR controlled by a switch R7—4 of the relay R7 determines the length of the interval during which reverse current is supplied to the motors.

Indexing motor M1 is now started by momentary closure of a switch MS-2 which completes an energizing circuit for a relay R9. Relay R9 locks up independently of the starting switch by closing switch R9—1 and closes switch R9—2 to complete the current supply circuit for the rectifier-amplifier RA. This starts motor M1 in operation.

Carriage traverse is started by closure of a switch MS-3. Assuming that the carrier 12 is in its forward position, limit switch LSR-2 will be closed as shown. Accordingly, closure of the traverse switch completes an energizing circuit by way of switch R4—1 and LSR-2 for control relays R10, R11 and R12. Relay R10 opens switch R10—1 to disconnect control device CD from the amplifier A and closes switch R10—2 to connect control device CD-1 in controlling relation with the amplifier. The carrier may thus be advanced in its return stroke at a speed determined by the setting of the control device CD-1, which for maximum efficiency will be set for the highest practical speed.

Relay R11 closes switch R11—1 to maintain relay R10 and the associated relays energized upon release of the traverse switch MS-3. Relay R12 closes switch R12—1 and R12—2 to connect the rectifier R to the control devices CD-1 and CD-2 so as to start the motor M to run in a direction effective to impart return movement to the carrier 12.

As the carrier approaches the limit position of its return stroke, the cam 101 acting on the roller 103 shifts the cutter frame 13 in a direction to bring the follower F and cutters C into engagement with the pattern P and workpieces W without bouncing or chatter. Upon reaching its limit position, the carrier operates limit switch LSR to close switch contacts LSR-1 and open contacts LSR-2. Closure of the first mentioned switch contacts completes an energizing circuit for relay R13 and relay R14. Relay R13 closes switch R13—1 to prepare a holding circuit for itself by way of limit switch LSF-1 which is closed when the carrier is away from its forward limit position. It also closes switch R13—2 to complete an energizing circuit for a solenoid SOL which shifts the movable member of the valve V1 to its alternate position. The valve now directs pressure fluid to the inner end of the cylinder 98 urging the piston 99 to the right and thus yieldably urging the cutter carrying frame 13 toward operative position.

The opening of limit switch LSR-2 brings about the deenergization of relays R10, R11 and R12. Relay R12 opens switches R12—1 and R12—2 to stop the traverse motor M. Relay R14 upon energizing closes switches R14—1 and R14—2 to reverse the connection of the rectifier R to the control devices CD-1 and CD-2 and thus start the motor M in a direction to move the carrier forwardly. As the frame 13 has been shifted to operated position by the actuator 14, the follower F is thus traversed longitudinally of the pattern P and the cutters C act to shape their associated workpieces W in conformity with the contour of the corresponding area of the pattern.

As the carrier reaches its forward limit position, limit switch LSF is operated to open switch contacts LSF-2 and close switch contacts LSF-1. Relay R13 is thus deenergized and by opening switch R13—2 brings about the deenergization of the solenoid SOL. The movable member of the valve V1 is then shifted to its alternate position by a spring 122 and pressure fluid is directed to the cylinder 98 so as to shift the cutter frame 13 to retracted position. Closure of switch LSF-1 completes a circuit for relays R10, R11 and R12 which become energized to initiate return movement of the carrier as previously described.

The foregoing cycle of operations is repeated at each end of the carrier stroke. In the meantime the indexing motor M1 rotates the pattern and workpieces slowly so as to present successive areas for the action of the follower and cutters.

Upon rotation of the pattern through a complete revolution and with the resultant shaping of the entire surface of each of the workpieces, arm 121 engages limit switch LS to open switch contacts LS-1 and close switch contacts LS-2. The timing of this action is such that for an interval both limit switch contacts are open, thus resulting in the deenergization of relays R2, R3 and R4. As a consequence the machine is brought to a stop, that is, the cutter driving motors and the indexing motor are stopped and the traverse of the carrier is interrupted. The finished workpieces may then be removed from the machine and a new set loaded therein for the next operating cycle.

When it is desired to operate the machine under manual control the conditioning operations are formed as above explained except that the automatic cycle switch AC is operated to open position. Consequently, upon operation of the traverse switch MS-3 relay R6 remains inoperative leaving control device CD-3 connected in controlling relation to the Amplidyne amplifier A. This control device may be set manually for any desired speed.

The machine may be conditioned for operation of the cutters C in both the forward and return strokes of the carrier by substituting a manually operable control switch for the switch R13—2 in the circuit for the solenoid SOL. Alternate control of traverse speed by control devices CD and CD2 may be retained or device CD alone may be rendered effective to control motor speed in both directions by simply disconnecting the relay R10.

It will be apparent that with the above control system little or no supervision of the machine is required after it has been properly set up and started in operation. A single operator may thus take care of several machines with a substantial saving in the labor costs of producing the finished articles.

The novel speed control provided in the machine permits the machine to be operated at the most efficient production rate at all times while operating on irregularly shaped articles. Thus, the automatic regulation of the traverse speed in conformity with the contour of the surface being shaped permits relatively flat surfaces to be shaped at maximum speed while inclined surfaces are shaped at a lower speed best suited for their angular disposition so that production time is reduced to a minimum. The improved machine therefore has a very high productive capacity and yet is capable of reproducing complicated surface contours very accurately and with a smooth true surface that can be finished with a minimum of supplementary operations.

We claim as our invention:

1. In a machine for shaping workpieces in conformity with an elongated pattern having an irregular generally curvilinear surface contour, a stationary frame, means on said frame for supporting the pattern and a plurality of workpieces with their longitudinal axes generally parallel, a frame supported for reciprocation relative to said stationary frame in a path parallel to the axis of said pattern, an auxiliary frame supported on said reciprocable frame for movement transversely of the axis of the pattern, a plurality of rotatably driven cutters mounted on said auxiliary frame, said cutters being spaced apart so that each one is adapted to operatively engage one of the workpieces supported on said stationary frame, a follower element mounted on said auxiliary frame engageable with the pattern to control the positioning of said cutters with respect to their associated workpieces, power actuated means for moving said reciprocable frame, other power actuated means for moving said auxiliary frame, control mechanism including control devices operated alternately as the reciprocable frame approaches opposite ends of its reciprocatory stroke for coordinating the operation of said other power actuated means with the reciprocation of said reciprocable frame so as to operatively associate the cutters with the workpieces when the support is moving in one direction and to retract the cutters from the workpieces when the support is moving in the other direction, and cooperating cam and follower means one of which is carried by the stationary frame and the other by the auxiliary frame for determining the limit position of said auxiliary frame when the cutters are retracted from the workpieces.

2. In a machine for shaping workpieces in conformity with an elongated pattern having an irregular generally curvilinear surface contour, a stationary frame, means on said frame for supporting the pattern and a plurality of workpieces with their longitudinal axes generally parallel, a second frame supported for reciprocation relative to said stationary frame in a path parallel to the axis of said pattern, an auxiliary frame supported on said second frame for movement transversely of the axis of the pattern, a plurality of rotatably driven cutters mounted on said auxiliary frame, said cutters being spaced apart so that each one is adapted to operatively engage one of the workpieces supported on said stationary frame, a follower element mounted on said auxiliary frame engageable with the pattern to control the positioning of said cutters with respect to their associated workpieces, power actuated means for reciprocating said second frame, reversible power actuated means operatively connected with said auxiliary frame and operable to hold said follower element in engagement with the pattern while said second frame is traveling in one direction and to retract the follower element from the pattern while the frame is traveling in the opposite direction, and cooperating cam and follower means interposed between said stationary frame and said auxiliary frame operative as an incident to the movement of said second frame in said opposite direction for shifting the auxiliary frame to engage said follower element with the pattern against the action of said reversible power actuated means.

3. In a machine for shaping workpieces in conformity with an elongated pattern having an irregular generally curvilinear surface contour, a stationary frame, means on said frame for supporting the pattern and a plurality of workpieces with their longitudinal axes generally parallel, a second frame supported for reciprocation relative to said stationary frame in a path parallel to the axis of said pattern, an auxiliary frame supported on said second frame for movement transversely of the axis of the pattern, a plurality of rotatably driven cutters mounted on said auxiliary frame, said cutters being spaced apart so that each one is adapted to operatively engage one of the workpieces supported on said stationary frame, a follower element mounted on said auxiliary frame engageable with the pattern to control the positioning of said cutters with respect to their associated workpieces, power actuated means for reciprocating said second frame, other power actuated means operatively connected with said auxiliary frame operable to hold said follower element in engagement with the pattern while said second frame is traveling in one direction and to retract the element from the pattern while the frame is traveling in the opposite direction, a stationarily supported cam, and follower means on said auxiliary frame cooperating with said cam in the travel of said second frame in said opposite direction for shifting the auxiliary frame in a direction to carry said follower means into engagement with the pattern independently of said other power actuated means.

4. In a machine for shaping workpieces in conformity with an elongated pattern having an irregular curved surface contour, in combination, a frame adapted to support the pattern and a plurality of workpieces with their longitudinal axes generally parallel, a carrier supporting a pattern following element and a plurality of cutters, power actuated means for relatively reciprocating said frame and said carrier in a path substantially parallel to the axis of the pattern, speed control mechanism for said power actuated means, other power actuated means for rotating the pattern and workpieces in synchronism, a second speed control mechanism for said other power actuated means, a first cam supported on said frame for rotation in synchronism with the pattern and workpieces, a follower mounted on said carrier for cooperation with said first cam in the relative reciprocation of said carrier and said frame, a control device actuated by said follower in response to its cooperation with the first cam for operating the first mentioned speed control mechanism to regulate the speed of the first power actuated means, a second cam mounted on said frame for rotation in timed relation to the rotation of the pattern and workpieces, and a second follower mounted on said frame cooperating with said second cam in its rotation, and means connecting said second follower with said second speed control mechanism for operating the latter to regulate the speed of said other power actuated means.

5. In a machine for shaping workpieces in conformity with an elongated pattern having an irregular curved surface contour, a combination, a frame adapted to support the pattern and a plurality of workpieces with their longitudinal axes generally parallel, a carrier supporting a pattern following element and a plurality of cutters, power actuated means for relatively reciprocating said frame and said carrier in a path substantially parallel to the axis of the pattern, speed control mechanism operable to vary the speed of relative reciprocation produced by said power actuated means, other power actuated means for rotating the pattern and workpieces in synchronism, a cam supported on said frame for rotation in synchronism with the pattern and workpieces, said cam having its surface coordinated with the radial dimensions of corresponding areas of the pattern, a follower mounted on said carrier for engagement with said cam in the relative reciprocation of the frame and carrier, and a control device actuated by said follower as it follows the changing contour of said cam for operating said speed control mechanism.

6. The combination with a work support and a tool support, of power actuated means on the work support for rotating a workpiece, a variable speed electric motor operative to relatively reciprocate said supports, a speed control device including an electronic amplifier operatively connected with said motor, a control cam mounted on said work support and rotatable in synchronism with the workpiece, a potentiometer in circuit with said amplifier, and a cam follower mounted on said work support cooperating with said cam in the relative reciprocation of said supports to actuate said potentiometer.

7. In a machine for shaping workpieces in conformity with an elongated pattern, the combination of a stationary frame, means supporting the pattern and a plurality of workpieces on said frame with their longitudinal axes parallel, a second frame supported for reciprocation in a path parallel to the axis of the pattern and for movement transversely of said path, means on said second frame supporting a follower and a plurality of cutters for operative engagement with the pattern and the respective workpieces, power operated means for reciprocating said second frame to traverse the follower and cutters longitudinally of the pattern and workpieces, a reversible actuator operative to shift said second frame transversely to feed the follower and cutters to the pattern and the workpieces, said actuator being operative in reverse to retract the second frame, stop means including interengageable elements on said stationary frame and said second frame defining the limit position of said second frame when retracted, the interengaging elements of said stop means being operative as an incident to the reciprocation of said second frame to shift it toward the operated position while said actuator is urging it toward the retracted position.

8. In a machine for shaping workpieces in conformity with an elongated pattern, the combination with a stationary frame, of means supporting the pattern and a plurality of workpieces on said frame with their axes parallel, a carrier disposed below said frame, means supporting and guiding said carrier for reciprocation in a path parallel to the axis of the pattern, a second frame supported on said carrier for reciprocation transversely of the reciprocating path of the carrier, said second frame comprising a plurality of generally rectangular frame members each apertured adjacent its four corners for the passage of elongated tie rods, said frame members being spaced apart uniformly longitudinally of the tie rods and rigidly anchored thereto, certain of said frame members supporting rotatably driven cutters and another frame member supporting a pattern follower, and guide rods supported on the frame members at each end of the frame, said guide rods being disposed substantially parallel to the tie rods and spaced laterally therefrom, and supporting means on said carrier engageable by said guide rods.

9. In a machine for shaping work pieces in conformity with an elongated pattern, the combination of a frame stationarily supported on a floor or the like, a second frame shiftable relative to the stationary frame, means supporting the pattern and a plurality of work pieces on one of said frames, means for supporting a follower and a plurality of cutters on the other of said frames for coaction with the pattern and the respective work pieces, an actuator connected to said second frame and operative to shift it in one direction to associate the follower and cutters with the pattern and the work pieces and to shift the frame in the opposite direction to a retracted position, cooperating stop and stop-engaging means for interrupting the retracting movement of said second frame, said stop-engaging means being mounted on and movable with the second frame, means yieldably supporting said stop means in the path of said stop-engaging means including a generally U-shaped frame having its opposite legs pivoted on said stationary frame to rock about a horizontal axis, and a resilient floor-engaging foot connecting to said U-shaped frame laterally of its pivotal axis normally operative to hold the U-shaped frame in a predetermined position and permitting rocking of the same from such position upon engagement of the stop means by said stop-engaging means.

10. In a machine for shaping work pieces in conformity with an elongated pattern, the combination of a frame stationarily supported on a floor or the like, a second frame shiftable relative to the stationary frame, means supporting the pattern and a plurality of work pieces on one of said frames, means for supporting a follower and a plurality of cutters on the other of said frames for coaction with the pattern and the respective work pieces, an actuator connected to said second frame and operative to shift it in one direction to associate the follower and cutters with the pattern and the work pieces and to shift the frame in the opposite direction to a retracted position, cooperating cam and follower means for interrupting the retracting movement of said second frame, said follower being mounted on and movable with the second frame, means supporting said cam in position to be engaged by said follower in the retraction of said second frame including a generally U-shaped frame having its opposite legs pivoted on said stationary frame to rock about a horizontal axis, and a resilient foot depending from said U-shaped frame for engagement with the floor to support said cam in the path of said cam follower, said foot yielding upon engagement of the follower with the cam to bring the second frame to a stop with a minimum of shock.

11. In a machine for shaping workpieces in conformity with an elongated pattern having an irregular curved surface contour, the combination of a frame having means for supporting the pattern and a plurality of workpieces with their longitudinal axes parallel and spaced apart laterally in a common plane, a carrier supporting a pattern follower element and a plurality of rotatably driven cutters in said plane and spaced apart for engagement with the pattern and the respective workpieces, motor driven means for relatively moving said carrier and the frame in a path generally parallel to the axis of the pattern, means yieldably urging said carrier in a direction to maintain said follower element in engagement with said pattern during such relative movements whereby the cutters are caused to take cuts longitudinally of the workpieces corresponding in contour to the area of the pattern traversed by the follower element, an elongated cam supported on said frame with its axis parallel to the pattern and having its surface shaped in coordinated relation to corresponding areas of the pattern, a cam follower element on said carrier positioned to traverse said cam longitudinally in the relative movements of the frame and carrier, control means actuated by said cam follower element for varying the speed of said motor driven means, and means for simultaneously rotating the pattern, cam and workpieces about their axes to present successive areas thereof to the followers and cutters in their successive traverses of the pattern, cam and workpieces.

DAVID B. SALSTROM.
DAVID N. SALSTROM.

References Cited in the file of this patent

UNITED STATES PATENTS

| Number | Name | Date |
|---|---|---|
| 470,659 | Brielmaier | Mar. 15, 1892 |
| 848,578 | Thelin | Mar. 26, 1907 |
| 954,456 | Norris | Apr. 12, 1910 |
| 1,277,203 | Ensign | Aug. 27, 1918 |
| 1,294,500 | Lyons | Feb. 18, 1919 |
| 1,679,912 | Mondloch | Aug. 7, 1928 |
| 1,688,439 | Smout | Oct. 23, 1928 |
| 1,796,879 | Werber | Mar. 17, 1931 |
| 1,798,926 | Black et al. | Mar. 31, 1931 |
| 1,895,122 | Benedict | Jan. 24, 1933 |
| 2,190,213 | Meyer | Feb. 13, 1940 |
| 2,340,953 | Gardner | Feb. 8, 1944 |
| 2,418,639 | Horman | Apr. 8, 1947 |
| 2,475,326 | Johnson | July 5, 1949 |
| 2,476,214 | Parsons | July 12, 1949 |
| 2,546,692 | Greene | Mar. 27, 1951 |